(12) United States Patent
Morini et al.

(10) Patent No.: US 7,592,286 B2
(45) Date of Patent: Sep. 22, 2009

(54) PROCESS FOR THE PREPARATION OF A CATALYST COMPONENT AND COMPONENTS THEREFROM OBTAINED

(75) Inventors: Giampiero Morini, Padova (IT); Tiziano Dall'Occo, Ferrara (IT); Fabrizio Piemontesi, Ferrara (IT); Rosa Spoto, Ferrara (IT); Paolo Vincenzi, Ficarolo (IT); Gianni Vitale, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 8 days.

(21) Appl. No.: 10/557,933

(22) PCT Filed: May 7, 2004

(86) PCT No.: PCT/EP2004/005186

§ 371 (c)(1),
(2), (4) Date: Nov. 23, 2005

(87) PCT Pub. No.: WO2004/106388

PCT Pub. Date: Dec. 9, 2004

(65) Prior Publication Data

US 2007/0021295 A1 Jan. 25, 2007

Related U.S. Application Data

(60) Provisional application No. 60/482,966, filed on Jun. 27, 2003.

(30) Foreign Application Priority Data

May 29, 2003 (EP) .................................. 03076697

(51) Int. Cl.
  C08F 4/64 (2006.01)
  C08F 4/649 (2006.01)
(52) U.S. Cl. ...................... 502/115; 502/103; 502/125; 502/127; 526/124.3; 526/124.9
(58) Field of Classification Search .................. 502/110, 502/103, 115, 125, 127; 527/110; 526/124.3, 526/124.9
See application file for complete search history.

(56) References Cited

U.S. PATENT DOCUMENTS

| | | | |
|---|---|---|---|
| 4,220,554 A | 9/1980 | Scatá et al. ............. | 252/429 B |
| 4,298,718 A | 11/1981 | Mayr et al. ................... | 526/125 |
| 4,336,360 A | 6/1982 | Giannini et al. ............. | 526/114 |
| 4,399,054 A | 8/1983 | Ferraris et al. | |
| 4,468,938 A | 9/1984 | McMillan .................... | 68/23.3 |
| 4,469,648 A | 9/1984 | Ferraris et al. ................. | 264/9 |
| 4,495,338 A | 1/1985 | Mayr et al. ................... | 526/125 |
| 4,521,573 A | 6/1985 | Lee et al. ..................... | 526/125 |
| 4,829,034 A | 5/1989 | Iiskolan et al. .................. | 302/9 |
| 5,100,849 A | 3/1992 | Miya et al. ..................... | 502/9 |
| 5,106,807 A * | 4/1992 | Morini et al. ............... | 502/121 |
| 5,278,118 A | 1/1994 | Cuffiana et al. ............. | 502/116 |
| 5,733,987 A | 3/1998 | Covezzi et al. ................ | 526/65 |
| 5,767,215 A * | 6/1998 | Garoff et al. ................ | 526/348 |
| 6,207,607 B1 | 3/2001 | Garoff et al. ................ | 502/127 |
| 6,468,938 B1 | 10/2002 | Govoni et al. ............... | 502/126 |
| 2002/0103302 A1* | 8/2002 | Cecchin et al. ............. | 525/247 |

FOREIGN PATENT DOCUMENTS

| | | |
|---|---|---|
| EP | 0395083 | 10/1990 |
| EP | 0452156 | 10/1991 |
| EP | 0491566 | 6/1992 |
| WO | 9221706 | 12/1992 |
| WO | 9303078 | 2/1993 |
| WO | 9844009 | 10/1998 |
| WO | 0058374 | 10/2000 |
| WO | 2004055065 | 7/2004 |

OTHER PUBLICATIONS

V. K. Gupta et al., "$MgCl_2$-$6H_2O$ -Based Titanium Catalysts for Propylene Polymerization, Chemical Composition and Productivity," *Applied Macromolecular Chemistry & Physics*, vol. 213(1), p. 113-125 (1993).

* cited by examiner

*Primary Examiner*—Caixia Lu
(74) *Attorney, Agent, or Firm*—William R. Reid

(57) ABSTRACT

A process for preparing a catalyst component, comprising a Mg compound a Ti compound and an electron donor compound (ED) selected from alcohol, glycols, esters, ketones, amines, amides, nitrites, alkoxysilanes and aliphatic ethers as essential compounds, comprising two or more steps of reaction involving the use of at least one of said essential compounds as fresh reactant alone or in a mixture in which it constitutes the main component, said process being characterized by the fact that in the last of said one or more reaction steps the essential compound used as a fresh reactant is the ED compound.

20 Claims, No Drawings

PROCESS FOR THE PREPARATION OF A CATALYST COMPONENT AND COMPONENTS THEREFROM OBTAINED

This application is the U.S. national phase of International Application PCT/EP2004/005186, filed May 7, 2004, claiming priority to European Patent Application 03076697.6 filed May 29, 2003, and the benefit under 35 U.S.C. 119(e) of U.S. Provisional Application No. 60/482,966, filed Jun. 27, 2003; the disclosures of International Application PCT/EP2004/005186, European Patent Application 03076697.6 and U.S. Provisional Application No. 60/482,966, each as filed, are incorporated herein by reference.

The present invention relates to a process for the preparation of a catalyst component for the polymerization of olefins $CH_2=CHR$, wherein R is hydrogen or a hydrocarbon radical having 1-12 carbon atoms. In particular, the present invention relates to a process for the preparation of catalyst components supported on Mg dichloride also comprising a Ti compound and an electron donor, and also relates to certain catalyst components therefrom obtained. These catalyst components, when converted into a catalyst, are particularly suitable for the preparation of copolymers of ethylene with α-olefins due to their capability of homogeneously distribute the α-olefins along the polymer chain and among the various polymer chains.

The catalysts including titanium compounds supported on magnesium halides are well known in the art. Catalysts of this type are described for example in the U.S. Pat. No. 4,298,718. Said catalysts comprise titanium tetrahalides supported on halides of magnesium. Although the catalysts have high activity in the polymerization of alpha olefins like propylene, they are not very stereospecific. Substantial improvements to the stereospecificity have been reached by adding certain electron-donor compounds to the solid catalyst component. Modern recipes for the preparation of these catalysts include first the contact between a $MgCl_2$ or its precursor, with the electron donor compound and a titanium compound (usually $TiCl_4$), and then one or more treatments of the so obtained solid with hot liquid $TiCl_4$. Examples of such processes are disclosed among others in EP491566. These processes yield catalyst components endowed with a generally high activity and stereospecificity in the propylene polymerization but also characterized by certain drawbacks. For example it is difficult with this kind of process to finely tune the final amount of donor because the successive treatments with the hot $TiCl_4$ take away a substantial part of it. Moreover, certain classes of electron donors cannot be used with this process simply because they are not stable under the hot treatments with $TiCl_4$. These drawbacks are particularly relevant in connection with certain kind of polyethylene catalysts that require high amount of donors to work properly.

One kind of catalyst preparation able to fix high amounts of donor on the catalyst component is that described for example in U.S. Pat. No. 4,521,573 which comprises the use of a large excess of the electron donor compound that acts as a solvent in respect of $MgCl_2$ and the titanium compound. The catalyst component can then be separated from the solution by precipitation or crystallization. This process suffers from several drawbacks. First, certain donors are not usable because in view of their chemical structure they are not able to act as solvents. Second, it is not possible to prepare a catalyst component with high porosity unless a substantial amount of donor is removed from the said catalyst component or the catalyst is in its turn deposited on a porous inert support. In the last case however, an additional step and further materials are required with the consequence that complexity of the process and costs are increased. As a further drawback, the polymerization activity showed by these catalysts are generally rather low.

In the European patent application EP 452156 a catalyst prepared according to the procedure comprising one or more treatments with hot $TiCl_4$ in excess after the donor has been added, is further treated with an additional electron donor compound in the presence of a major molar amount of $AlEt_3$. This method however, would not be viable for substantially increasing the content of the electron donor in the catalyst component because it would subject the catalyst component itself to a contact with very high amounts of a very reactive compound ($AlEt_3$) which would heavily alter the properties of the pre-formed catalyst component.

It would be therefore important to have a process suitable for the preparation of a donor containing catalyst component in which the content of donor could be easily modulated and in which the catalyst component can show additional properties or retain those derivable from their essential constituents.

It is therefore an aspect of the present invention a process for preparing a catalyst component supported on $MgCl_2$, and comprising the use of a Mg compound, a Ti compound and an electron donor compound (ED) selected from alcohol, glycols, esters, ketones, amines, amides, nitrites, alkoxysilanes and aliphatic ethers as essential compounds, said process comprising two or more steps of reaction involving the use of at least one of said essential compounds as fresh reactant alone or in a mixture in which it constitutes the main component, and being characterized by the fact that in the last of said one or more reaction steps the essential compound used as a fresh reactant is the ED compound.

It also constitutes an aspect of the present invention the catalyst components obtainable from the described process.

In the present invention with the term "fresh reactant" is intended an amount of an essential compound which comes into contact for the first time with the reaction mixture.

With the term "mixture in which it constitutes the main component" we intend that the essential compound must be the main component in terms of molar amount, with respect to the other possible compounds excluded inert solvent or diluents used to handle the said mixture.

The electron donor compounds (ED) can be used alone or in mixture with each other. Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

Preferred alkoxysilanes are those of formula $R_a^5R_b^6Si(OR^7)_c$, where a and b are integer from 0 to 2, c is an integer from 1 to 4 and the sum (a+b+c) is 4; $R^5$, $R^6$, and $R^7$, are alkyl, cycloalkyl or aryl radicals with 1-18 carbon atoms optionally containing heteroatoms. Particularly preferred are the silicon compounds in which a is 0 or 1, c is 2 or 3, $R^6$ is an alkyl or cycloalkyl group, optionally containing heteroatoms, and $R^7$ is methyl. Examples of such preferred silicon compounds are methyltrimethoxysilane, dimethyldimethoxysilane, trimethylmethoxysilane and t-butyltrimethoxysilane.

Preferred alcohol are those of formula $R^3OH$" in which the $R^3$ group is a C1-C20 hydrocarbon group. Preferably, $R^3$ is a C1-C10 alkyl group. Specific examples are methanol, ethanol, isopropanol and butanol.

Preferred amines are those of formula $NR^4_3$ in which the $R^4$ groups, are, independently, hydrogen or a C1-C20 hydrocarbon group with the proviso that they are not contemporaneously hydrogen. Preferably, $R^4$ is a C1-C10 alkyl group. Specific examples are dietilamine, diisopropylamine and triethylamine Preferred amides are those of formula $R^5CONR^6{}_2$ in which $R^5$ and $R^6$ are, independently, hydrogen or a C1-C20 hydrocarbon group. Specific examples are formamide and acetamide.

Preferred nitriles are those of formula $R^3CN$ where $R^3$ has the same meaning given above. A specific example is acetonitrile.

Preferred glycol are those having a total number of carbon atoms lower than 50. Among them particularly preferred are the 1,2 or 1,3 glycol having a total number of carbon atoms lower than 25. Specific examples are ethylenglycol, 1,2-propylenglycol and 1,3-propylenglycol.

Preferably the ED compound is selected among, amides, esters and alkoxysilanes.

Among suitable titanium compounds are the tetrahalides or the compounds of formula $TiX_n(OR^1)_{4-n}$, where $0 \leq n \leq 3$, X is halogen, preferably chlorine, and $R^1$ is $C_1$-$C_{10}$ hydrocarbon group. The titanium tetrachloride is the preferred compound.

In the catalyst components obtained from the process of the invention, the $MgCl_2$ is the basic support even if minor amount of additional carriers can be used. The $MgCl_2$ can be used as such or obtained from Mg compounds used as precursors that can be transformed into $MgCl_2$ by the reaction with halogenating compounds. Particularly preferred is the use of $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line.

The process of the present invention, in its basic version, is simple to be carried out. In fact, it comprises first contacting the titanium compound and the Mg compound, preferably Mg dihalide, optionally in the presence of an inert medium, in order to prepare an intermediate product, containing a titanium compound supported on Mg dichloride, that, if desired can also be isolated. Subsequently, the ED compound is then contacted with this intermediate product under condition such that it is added to the reaction mixture alone or in a mixture with other compounds in which it represents the main component in terms of molar amount. The ED treated product can then be subject to washings with the proper solvents in order to recover the final product. If needed, the treatment with the ED compound desired can be repeated one or more times. If pre-formed $MgCl_2$ is used a starting compound, it is preferred that it is in active form. The patents U.S. Pat. Nos. 4,298,718 and 4,495,338 describe how to obtain $MgCl_2$ in active form. The titanium compound is preferably titanium tetrachloride.

On this basic process several variations can be made each of which having the purpose of imparting to the catalyst or to the process itself specific characteristics. Therefore, as mentioned above, a precursor of Mg dihalide can be used as starting essential Mg compound. This can be selected for example among Mg compound of formula $MgR'_2$ where the R' groups can be independently C1-C20 hydrocarbon groups optionally substituted, OR groups, OCOR groups, halogen, in which R is a C1-C20 hydrocarbon groups optionally substituted, with the obvious proviso that the R' groups are not simultaneously halogen. Also suitable as precursors are the Lewis adducts between Mg dihalides and suitable Lewis bases. A particular and preferred class being constituted by the $MgX_2$ $(R''OH)_m$ adducts in which R'' groups are C1-C20 hydrocarbon groups, preferably C1-C10 alkyl groups, X is halogen preferably chlorine and m is from 0.1 to 6, preferably from 0.5 to 3 and more preferably from 0.5 to 2. Adducts of this type can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. Nos. 4,469,648, 4,399,054, and WO98/44009. Another useable method for the spherulization is the spray cooling described for example in U.S. Pat. Nos. 5,100,849 and 4,829,034.

Particularly interesting are the $MgCl_2 \cdot (EtOH)_m$ adducts in which m is from 0.15 to 1.7 obtained subjecting the adducts with a higher alcohol content to a thermal dealcoholation process carried out in nitrogen flow at temperatures comprised between 50 and 150° C. until the alcohol content is reduced to the above value. A process of this type is described in EP 395083.

The dealcoholation can also be carried out chemically by contacting the adduct with compounds capable to react with the alcohol groups.

Generally these dealcoholated adducts are also characterized by a porosity (measured by mercury method) due to pores with radius due to pores with radius up to 0.1 μm ranging from 0.15 to 2.5 cm$^3$/g preferably from 0.25 to 1.5 cm$^3$/g.

The $MgX_2$ $(R''OH)_m$ adducts are generally converted into the corresponding halides through the reaction with dealcoholating compounds. The dealcoholating agent can be any chemical agent having functionalities capable to react with the OH groups. A particular group of dealcoholating agents is that of alkyl aluminum compounds. Suitable alkyl aluminum compounds are the trialkyl aluminum compounds such as for example triethylaluminum, triisobutylaluminum, tri-n-butylaluminum, tri-n-hexylaluminum, tri-n-octylaluminum and tris(2,4,4-trimethyl-pentyl)aluminum. It is also possible to use mixtures of trialkylaluminum compounds with alkylaluminum halides, alkylaluminum hydrides or alkylaluminum sesquichlorides, such as $AlEt_2Cl$ and $Al_2Et_3Cl_3$.

It is known that alkylaluminum compounds can have a reducing activity with respect to the Ti compounds. Accordingly, if this activity is undesired, a deactivating agent, for instance $O_2$, can be added before carrying out the step (b) and thus avoiding the reduction of the titanium compound.

Another group of usable dealcoholating agent is that of halogen-containing silicon compounds. Specific examples of such silicon compounds include the silicon halides having formula $SiX_{4-n}Y_n$, in which X and Y represent halogen atoms, e.g., Cl and Br, and n is a number varying from zero to 3. The use of $SiCl_4$ is particularly preferred.

In one of the particular embodiments of the present invention it is preferred that the dealcoholation reaction is carried out simultaneously with the step of reaction involving the use of a titanium compound. Accordingly, these adducts are reacted with the $TiX_n(OR^1)_{4-n}$ compound (or possibly mixtures thereof) mentioned above which is preferably titanium tetrachloride. The reaction with the Ti compound can be carried out by suspending the adduct in $TiCl_4$ (generally cold) the mixture is heated up to temperatures ranging from 80-130° C. and kept at this temperature for 0.5-2 hours. The treatment with the titanium compound can be carried out one or more times. Preferably it is repeated twice. It can also be carried out in the presence of an electron donor compound as those mentioned above. At the end of the process the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated hydrocarbons.

The so obtained solid intermediate can also undergo a post-treatment with particular compounds suitable to impart to it specific properties. As an example, it can be subject to a treatment with a reducing compound for example an Al-alkyl compound, in order to lower the oxidation state of the titanium compound contained in the solid.

Another example of treatment that can be carried out on the intermediate is a pre-polymerization step. The pre-polymerization can be carried out with any of the olefins $CH_2=CHR$, where R is H or a C1-C10 hydrocarbon group. In particular, it is especially preferred to pre-polymerize ethylene or propylene or mixtures thereof with one or more α-olefins, said mixtures containing up to 20% in moles of α-olefin, forming amounts of polymer from about 0.1 g up to about 1000 g per gram of solid intermediate, preferably from about 0.5 to about 500 g per gram per gram of solid intermediate. The pre-polymerization step can be carried out at temperatures from 0 to 80° C., preferably from 5 to 70° C., in the liquid or gas phase. The pre-polymerization of the intermediate with ethylene or propylene in order to produce an amount of polymer ranging from 0.5 to 20 g per gram of intermediate is particularly preferred. The pre-polymerization is carried out with the use of a suitable coatalyst such as organoaluminum compounds that can also be used in combination with one or more external donors that are below discussed in detail.

As mentioned above, the intermediate product is then brought into contact with the ED compound under conditions able to fix on the solid an effective amount of donor. Due to the high versatility of this method, the amount of donor used can widely vary. As an example, it can be used in molar ratio with respect to the Ti content in the intermediate product ranging from 0.5 to 20 and preferably from 1 to 10. Although not strictly required the contact is typically carried out in a liquid medium such as a liquid hydrocarbon. The temperature at which the contact takes place can vary depending on the nature of the reagents. Generally it is comprised in the range from −10° to 150° C. and preferably from 0° to 120° C. It is plane that temperatures causing the decomposition or degradation of any specific reagents should be avoided even if they fall within the generally suitable range. Also the time of the treatment can vary in dependence of other conditions such as nature of the reagents, temperature, concentration etc. As a general indication this contact step can last from 10 minutes to 10 hours more frequently from 0.5 to 5 hours. If desired, in order to further increase the final donor content, this step can be repeated one or more times. At the end of this step the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated or oxygenated hydrocarbons.

Also in this case the so obtained solid can undergo a post-treatment with particular compounds suitable to impart to it specific properties. As an example It can be subject to a treatment with a reducing compound for example an Al-alkyl compound, in order to lower the oxidation state of the titanium compound contained in the solid.

It has been already described that various donors in a wide range of amounts in respect of the titanium content can be used in the process of the invention. All the catalysts obtained generally show good performances in particular in the homopolymerization of ethylene and in its copolymerization with C3-C10 alpha olefins in order to produce ethylene alpha olefin copolymers containing up to 20% mol of alpha olefin. Particularly interesting are the catalyst components comprising a Ti compound and an electron donor (ED) selected from alcohol, ketones, amines, amides, nitriles, alkoxysilanes, aliphatic ethers, and esters of aliphatic carboxylic acids supported on Mg dichloride, in which the ED/Ti molar ratio ranges from 1.5 to 3.5 and the Mg/Ti molar ratio is higher than 5.5. Preferably, the ED/Ti molar ratio preferably ranges from 2 to 3.4 and more preferably from 2.2 to 3.3. Preferably, the Mg/Ti ratio ranges from 7 to 110, more preferably from 8 to 80 and particularly from 8 to 50.

Preferred donors are those mentioned above. Moreover, are also preferred the aliphatic ethers and particularly the C2-C20 aliphatic ethers. The cyclic ethers preferably having 3-5 carbon atoms such as tetrahydrofurane (THF) or dioxane are especially preferred. Excellent results have been obtained with the use of esters like ethylacetate as ED compound. The catalysts having the sad composition which are also pre-polymerized are also preferred.

The solid catalyst components according to the present invention are converted into catalysts for the polymerization of olefins by reacting them with organoaluminum compounds according to known methods.

In particular, it is an object of the present invention a catalyst for the polymerization of olefins $CH_2=CHR$, in which R is hydrogen or a hydrocarbyl radical with 1-12 carbon atoms, comprising the product of the reaction between:

(a) a solid catalyst component as described above,
(b) an alkylaluminum compound and, optionally,
(c) an external electron donor compound.

The alkyl-Al compound can be preferably selected from the trialkyl aluminum compounds such as for example trimethylaluminum (TMA), triethylaluminum (TEAL), triisobutylaluminum (TIBA), tri-n-butylaluminum, tri-n-hexylaluminum, tri-n-octylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used. It is also possible to use, and in certain cases preferred, mixtures of trialkylaluminum's with alkylaluminum halides. Among them mixtures TEAL/DEAC and TIBA/DEAC are particularly preferred. The external electron donor compound can be equal to or different from the ED used in the solid catalyst component. Preferably it is selected from the group consisting of ethers, esters, amines, ketones, nitriles, silanes and mixtures of the above. In particular it can advantageously be selected from the C2-C20 aliphatic ethers and in particulars cyclic ethers preferably having 3-5 carbon atoms cyclic ethers such as tetrahydrofurane, dioxane.

In addition, the electron donor compound can also be advantageously selected from silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The above mentioned components (a)-(c) can be fed separately into the reactor where, under the polymerization conditions can exploit their activity. It constitutes however a particular advantageous embodiment the pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C.

The so formed catalyst system can be used directly in the main polymerization process or alternatively, it can be pre-polymerized beforehand especially if a prepolymerization of the intermediate solid was not carried out. A pre-polymerization step is usually preferred when the main polymerization process is carried out in the gas phase. The prepolymerization can be carried out with any of the olefins $CH_2$=CHR, where R is H or a C1-C10 hydrocarbon group. In particular, it is especially preferred to pre-polymerize ethylene or propylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with ethylene or propylene in order to produce an amount of polymer ranging from 0.5 to 20 g per gram of catalyst component is particularly preferred. The pre-polymerized catalyst component can also be subject to a further treatment with a titanium compound before being used in the main polymerization step. In this case the use of $TiCl_4$ is particularly preferred. The reaction with the Ti compound can be carried out by suspending the prepolymerized catalyst component in the liquid Ti compound optionally in mixture with a liquid diluent; the mixture is heated to 60-120° C. and kept at this temperature for 0.5-2 hours.

Examples of gas-phase processes wherein it is possible to use the catalysts of the invention are described in WO 92/21706, U.S. Pat. No. 5,733,987 and WO 93/03078. These processes comprise a pre-contact step of the catalyst components, a pre-polymerization step and a gas phase polymerization step in one or more reactors in a series of fluidized or mechanically stirred bed. In a particular embodiment, the gas-phase process can be suitably carried out according to the following steps:

(i) contacting the catalyst components (a), (b) and optionally (c) for a period of time ranging from 0.1 to 120 minutes, at a temperature ranging from 0 to 90° C.; optionally (ii) pre-polymerizing with one or more olefins of formula $CH_2$=CHR, where R is H or a C1-C10 hydrocarbon group, up to forming amounts of polymer from about 0.1 up to about 1000 g per gram of solid catalyst component (a); and (iii) polymerizing in the gas-phase ethylene, or mixtures thereof with α-olefins $CH_2$=CHR in which R is a hydrocarbon radical having 1-10 carbon atoms, in one or more fluidized or mechanically stirred bed reactors, in the presence of the product coming from (i) or (ii).

As already mentioned, the catalysts of the present invention are particularly suitable for preparing linear low density polyethylenes (LLDPE, having a density lower than 0.940 g/cm$^3$) and very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%. However, they can also be used to prepare a broad range of polyolefin products including, for example, high density ethylene polymers (HDPE, having a density higher than 0.940 g/cm$^3$), comprising ethylene homopolymers and copolymers of ethylene with alpha-olefins having 3-12 carbon atoms; elastomeric copolymers of ethylene and propylene and elastomeric terpolymers of ethylene and propylene with smaller proportions of a diene having a content by weight of units derived from ethylene of between about 30 and 70%; isotactic polypropylenes and crystalline copolymers of propylene and ethylene and/or other alpha-olefins having a content of units derived from propylene of higher than 85% by weight; impact resistant polymers of propylene obtained by sequential polymerization of propylene and mixtures of propylene with ethylene, containing up to 30% by weight of ethylene; copolymers of propylene and 1-butene having a number of units derived from 1-butene of between 10 and 40% by weight.

The following examples are given in order to further describe the present invention in a non-limiting manner.

Characterization

The properties are determined according to the following methods:

Melt Index: measured at 190° C. according to ASTM D-1238 condition "E" (load of 2.16 Kg) and "F" (load of 21.6 Kg);

Fraction soluble in xylene. The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Comonomer Content

1-Butene was determined via Infrared Spectrometry.

The α-olefins higher than 1-butene were determined via Infra-Red analysis.

Effective density: ASTM-D 1505

Thermal analysis: Calorimetric measurements were performed by using a differential scanning calorimeter DSC Perkin-Elmer. The instrument is calibrated with indium and tin standards. The weighted sample (5-10 mg), obtained from the Melt Index determination, was sealed into aluminum pans, thermostatted at 5° C. for 3 minutes, heated to 200° C. at 20° C./min and kept at that temperature for a time long enough (5 minutes) to allow a complete melting of all the crystallites. Successively, after cooling at 20° C./min to −20° C., the peak temperature was assumed as crystallization temperature (Tc). After standing 5 minutes at 0° C., the sample was heated to 200° C. at a rate of 20° C./min. In this second heating run, the peak temperature was assumed as melting temperature (Tm) and the area as the global melting enthalpy (ΔH).

Determination of Mg, Ti: has been carried out via inductively coupled plasma emission spectroscopy (ICP).

Determination of Cl: has been carried out via potentiometric titration.

Determination of ED: via Gas-Chromatography analysis

EXAMPLES

General Procedure for the Preparation of the Spherical $MgCl_2$ (EtOH) Adducts

A magnesium chloride and alcohol adduct containing about 3 mols of alcohol was prepared following the method described in example 2 of U.S. Pat. No. 4,399,054, but working at 2000 RPM instead of 10000 RPM.

Adducts containing decreasing amounts of alcohol (47% wt, 35% wt, 25% wt and 15% wt) were prepared via a thermal treatment, under nitrogen stream, over a temperature range of 50-150° C.

General Procedure for the Preparation of the Intermediate of the Solid Catalyst Component:

Into a 500 mL four-necked round flask, purged with nitrogen, 250 mL of $TiCl_4$ were introduced at 0° C. Then, at the same temperature, 17.5 g of a spherical $MgCl_2$/EtOH adduct containing 25% wt of ethanol and prepared as described above were added under stirring. The temperature was raised to 130° C. in 1 h and maintained for 60 min. Then, the stirring was discontinued, the solid product was allowed to settle and the supernatant liquid was siphoned off.

The solid was washed six times with anhydrous hexane (5×100 mL) at 60° C. and once at 25° C. Finally, the solid was dried under vacuum and analyzed (Ti=4.9% wt; Mg=19.4% wt).

General Procedure for the Preparation of the Final Solid Catalyst Component (Contact of the Intermediate with ED)

In a 500 mL four-necked round flask equipped with a mechanical stirrer and purged with nitrogen, 200 mL of anhydrous hexane and 10 g of the solid intermediate component obtained as disclosed above were charged at room temperature. At the same temperature, under stirring an amount of the desired ED to achieve a molar ED/Ti ratio of 4 was added dropwise. The temperature was raised to 50° C. and the mixture was stirred for 3 hours. Then, the stirring was discontinued, the solid product was allowed to settle and the supernatant liquid was siphoned off.

The solid was washed 3 times with anhydrous hexane (3×100 mL) at 25° C., recovered, dried under vacuum and analyzed.

Ethylene/α-Olefin Copolymerization: General Procedure

A 4.5 liter stainless-steel autoclave equipped with a magnetic stirrer, temperature and pressure indicators, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (amount as reported in table 2 and 4), ethylene (7.0 bar, partial pressure) and hydrogen (as in table 2 and 4).

In a 100 cm³ three neck glass flask were introduced in the following order, 50 cm³ of anhydrous hexane, 9.6 cm³ of 10% by wt/vol TEA/hexane solution (or the equivalent amount of the cocatalyst reported in Table 2 and 4), optionally the external electron donor compound (table 2 and 4) and the solid catalyst of example (amount reported in table 2 and 4). They were mixed together and stirred at room temperature for 5 minutes and then introduced in the reactor through the steel vial by using a nitrogen overpressure.

Under continuous stirring, the total pressure was maintained constant at 75° C. for 60 minutes by feeding ethylene. At the end the reactor was depressurized and the temperature was dropped to 30° C. The recovered polymer was dried at 70° C. under a nitrogen flow and weighted.

Examples 1-12

A series of catalyst components was prepared using different electron donor (ED) compounds. The catalysts were prepared using spherical $MgCl_2$(EtOH) adducts, prepared according to the procedure described above containing 25% wt. of EtOH, that were first treated with $TiCl_4$ for preparing the intermediate according to the procedure disclosed above and then contacted, according to the general procedure, with the specific ED compound used in the feed ratio reported in Table 1.

The so obtained catalysts were then used in the copolymerization of ethylene carried out according to the general procedure reported above and under the specific conditions listed in Table 2 which also contain the data relating to the characterization of the polymer.

Examples 13-14

The catalyst was prepared according to the same procedure disclosed in Examples 1-12 using AcOEt as electron donor with the difference that the molar feed ratio ED/Ti was 8, 4 and 1 respectively. The so obtained catalysts were then used in the copolymerization of ethylene carried out according to the general procedure reported above and under the specific conditions listed in Table 4 which also contain the data relating to the characterization of the polymer.

Example 15

A solid intermediate prepared according to the general procedure was injected into an autoclave and kept at 30° C. stirring in anhydrous hexane (the concentration of the solid was 40 g/L) under nitrogen atmosphere. The suspension was treated with an amount of a 10% wt solution of tri-ethyl-aluminium (TEA) in hexane to achieve a ratio TEA/solid=0.5 wt/wt. An amount of propylene equal to 0.7 times the initial quantity of the solid was then slowly fed with a rate suitable to keep the temperature constant at 30° C. After 30 minutes the polymerization was stopped. The solid was washed 3 times with anhydrous hexane at 25° C., and suspended again in hexane and treated with AcOEt as the ED compound according to the general procedure with the difference that the AcOEt/Ti feed molar ratio was 8. The characteristics of the catalyst component are reported in Table 3 and the results of the copolymerization are reported in Table 4.

Example 16

The catalyst was prepared according to the same procedure disclosed in Examples 1-12 using AcOEt as ED with the difference that the temperature at which the contact took place was 0° C. The characteristics of the catalyst component are reported in Table 3 and the results of the copolymerization are reported in Table 4.

Example 17

The catalyst was prepared according to the same procedure disclosed in Examples 1-12 using AcOEt as ED with the difference that the contact was carried out at 100° C. in heptane instead of hexane. The characteristics of the catalyst component are reported in Table 3 and the results of the copolymerization are reported in Table 4.

Example 18

The catalyst was prepared according to the same procedure disclosed in Examples 1-12 using AcOEt as ED with the difference that the contact was carried out in toluene instead of hexane. The characteristics of the catalyst component are reported in Table 3 and the results of the copolymerization are reported in Table 4.

Example 19

The catalyst was prepared according to the same procedure disclosed in Examples 1-12 using AcOEt as ED with the difference that the contact step was carried out for two times. The first one was carried out at AcOEt/Ti feed molar ratio of 1 for 30 minutes, in the second, carried out after having washed the solid with hexane, the AcOEt/Ti feed molar ratio was 4 and the contact lasted 2.5 hours. The characteristics of the catalyst component are reported in Table 3 and the results of the copolymerization are reported in Table 4.

Example 20

The catalyst was prepared according to the same procedure disclosed in Examples 1-12 using AcOEt as ED with the difference that the ED contact step was carried out for 1 hour. The characteristics of the catalyst component are reported in Table 3 and the results of the copolymerization are reported in Table 4.

Example 21

The catalyst was prepared according to the same procedure disclosed in Examples 1-12 using AcOEt as ED with the difference that the ED contact step was carried out for 2 hours. The characteristics of the catalyst component are reported in Table 3 and the results of the copolymerization are reported in Table 4.

Example 22

The catalyst was prepared according to the same procedure disclosed in Examples 1-12 using AcOEt as ED with the difference that the ED contact step was carried out for 5 hours. The characteristics of the catalyst component are reported in Table 3 and the results of the copolymerization are reported in Table 4.

Example 23

The solid intermediate prepared according to the general procedure was stirred in anhydrous heptane, at 90° C. (the concentration of the solid was 40 g/L) with aluminium diethyl monochloride (DEAC), under nitrogen atmosphere, using DEAC at a molar Al/Ti ratio of 10. After 1 hour the stirring was discontinued, the solid product was allowed to settle and the supernatant liquid was siphoned off. A second DEAC treatment in the same conditions as the previous one was then performed. The solid was washed once with anhydrous heptane at 90° C. and twice with anhydrous hexane at room temperature. The solid was dried under vacuum and analyzed ($Ti_{total}$=4.6% wt; $Ti^{3+}$=2.9% wt; Mg=20% wt). Then the contact step with the ED was performed as described in the general procedure using AcOEt as ED with the difference that the reaction time was 2 hours. The characteristics of the catalyst component are reported in Table 3 and the results of the copolymerization are reported in Table 4.

Example 24

A pre-polymerized intermediate obtained as described in example 15 was suspended in hexane and treated, under stirring, at 50° C. for 1 hour with $TiCl_4$ (Prepolymer/$TiCl_4$=24 wt/wt). The solid was washed 3 times with anhydrous hexane at 25° C., and suspended again in hexane. The subsequent treatment with AcOEt was carried out as described in the general procedure with the difference that the ED/Ti molar feed ratio was 8. The characteristics of the catalyst component are reported in Table 3 and the results of the copolymerization are reported in Table 4.

Example 25

The catalyst was prepared according to the same procedure disclosed in Examples 1-12 using AcOEt as ED with the difference that in the preparation of the solid intermediate the $TiCl_4$ treatment was performed at 100° C. instead of 130° C. and a second $TiCl_4$ treatment at 100° C. (30 minutes) was inserted prior to the washing steps. (Ti 1.9% wt; Mg 19.4% wt). The characteristics of the catalyst component are reported in Table 3 and the results of the copolymerization are reported in Table 4.

Example 26

The catalyst was prepared according to the same procedure disclosed in Examples 1-12 with the difference that in the ED contact step the ED was constituted by a AcOEt/THF mixture (1/1 mol/mol). The total ED/Ti molar ratio was equal to 4. The characteristics of the catalyst component are reported in Table 3 and the results of the copolymerization are reported in Table 4.

Example 27

A $MgCl_2$ precursor was prepared by following the procedure described in example 1 (a) of U.S. Pat. No. 4,220,554. The so obtained solid was then treated with $TiCl_4$ in order to prepare the solid intermediate, in accordance with the general procedure, with the difference that the $TiCl_4$ treatment was performed at 120 instead of 130° C. and further two $TiCl_4$ treatments at 120° C. (30 minutes) were inserted prior to the washing steps. The solid was washed twice with anhydrous hexane (2×100 mL) at 60° C. and twice at 25° C. Finally, the solid was dried under vacuum and analyzed (Ti=5.8% wt; Mg=18.8% wt). The contact step with AcOEt was carried out according to the general procedure. The characteristics of the catalyst component are reported in Table 3 and the results of the copolymerization are reported in Table 4.

Examples 28-30

The catalyst components were prepared according to the same procedure disclosed in Examples 1-13 using AcOEt as electron donor with the difference that the starting spherical $MgCl_2$(EtOH) adducts had an alcohol content by weight of 47.3%, 35%, and 14.3% respectively. The characteristics of the catalyst components are reported in Table 3 and the results of the copolymerization are reported in Table 4.

TABLE 1

| | Catalyst preparation | ED/Ti feed m.r | Catalyst composition | | | | | |
|---|---|---|---|---|---|---|---|---|
| Ex. | ED | | Mg wt. % | Ti wt. % | Cl wt. % | ED Wt. % | ED/Ti m.r | Mg/Ti m.r |
| 1 | Ethyl acetate | 3 | 17.7 | 4 | 56.6 | 20.7 | 2.8 | 8.7 |
| 2 | Diethyl malonate | 4 | 14.3 | 3.7 | 47.7 | 37.4 | 3 | 7.6 |
| 3 | Diethyl succinate | 4 | 13.4 | 3.6 | 47.2 | 31.5 | 2.4 | 7.3 |
| 4 | THF | 4 | 16.9 | 4 | 54.7 | 17.6 | 3 | 8.3 |
| 5 | Dimethylformamide | 4 | 16.9 | 4.1 | 55.2 | 14.9 | 2.4 | 8.1 |
| 6 | Diethylamine | 4 | 16.9 | 3.4 | 55.9 | 18.5 | 3.6 | 9.8 |
| 7 | di-i-propylamine | 4 | 19.6 | 5 | 67.9 | 29.1 | 2.8 | 7.7 |
| 8 | Triethylamine | 4 | 19.9 | 5.1 | 65.7 | 36.2 | 3.4 | 7.7 |
| 9 | Tetrahydrofurfuryl Acetate | 4 | 16.4 | 3.8 | 53.9 | 22.6 | 2 | 8.5 |
| 10 | Ehtylen-Glycol | 4 | 15.8 | 3.6 | na | 12.4 | 2.7 | 8.6 |
| 11 | DimethyldimethoxySilane | 4 | 19.6 | 5 | 62.7 | 19.7 | 1.6 | 7.7 |
| 12 | MethyltrimethoxySilane | 4 | 19.2 | 4.6 | 59.4 | 24.2 | 1.8 | 8.2 |

TABLE 2

| | Polymerization conditions | | | α-olefin | | Polymer Characterization | | | | | |
|---|---|---|---|---|---|---|---|---|---|---|---|
| Ex. | Cat. mg | Cocatalyst type | Ext.Donor type | Al/ED mol | $C_4^-$ g | $H_2$ Bar | Yield Kg/g*h | $C_4^-$ % wt | MIE g/10' | density g/cc | Tm °C. | X.S % wt |
| 1 | 15 | TMA | THF | 5 | 150 | 1.8 | 11.8 | 4.9 | 0.6 | 0.925 | 122.3 | 2.3 |
| 2 | 20.5 | TEA/DEAC 2-1 | THF | 5 | 180 | 1.5 | 4.4 | 19.3 | 2.2 | 0.916 | 122.1 | 10.2 |
| 3 | 20.8 | TEA/DEAC 2-1 | THF | 5 | 180 | 1.5 | 3.2 | 9.8 | 1.26 | 0.9179 | 122.7 | 14.6 |
| 4 | 13.7 | TMA | — | | 150 | 1 | 13.4 | 8.1 | 1 | 0.9161 | 121.5 | 12.8 |
| 5 | 20.7 | TEA | — | | 150 | 1 | 2.7 | 7.9 | 0.7 | 0.9175 | 123.2 | 12.1 |
| 6 | 22 | TEA | — | | 150 | 1 | 2.2 | 10.6 | 3.5 | 0.9195 | 122.9 | 16.5 |
| 7 | 5.3 | TEA | — | | 150 | 1 | 19.3 | 14.8 | 2.1 | 0.9113 | 118.9 | 25.8 |
| 8 | 21.4 | TEA | — | | 150 | 1 | 7.7 | 9.8 | 2.5 | 0.9115 | 121.2 | 18.8 |
| 9 | 24.8 | TEA | — | | 180 | 1 | 7.7 | 8.6 | 0.8 | 0.9142 | 121.5 | 19 |
| 10 | 41.1 | TEA/DEAC 2-1 | THF | 5 | 200 | 1.5 | 3.5 | 9.7 | 0.8 | 0.9168 | 121.5 | 15.7 |
| 11 | 20.5 | TEA | — | | 150 | 1 | 8.5 | 6.5 | 2.2 | 0.9234 | 122.7 | 10.1 |
| 12 | 21 | TEA | — | | 150 | 1 | 8 | 7.4 | 0.3 | 0.9227 | 122.3 | 6.7 |

TABLE 3

| | Catalyst composition | | | | | |
|---|---|---|---|---|---|---|
| Ex. | Mg | Ti | Cl | ED | ED/Ti | Mg/Ti |
| 13 | 14.6 | 3 | 48.7 | 36.5 | 6.6 | 9.6 |
| 14 | 15.2 | 3.6 | 52 | 27 | 4.1 | 8.3 |
| 15 | 10.1 | 2.3 | na | 24 | 5.7 | 8.6 |
| 16 | 19 | 4.8 | 62.6 | 12.6 | 1.4 | 7.8 |
| 17 | 16.5 | 4.1 | 49.4 | 26 | 3.4 | 7.9 |
| 18 | 18.6 | 2.8 | 60.4 | 21.7 | 4.2 | 13.1 |
| 19 | 14 | 2.9 | 47 | 31.9 | 6.0 | 9.5 |
| 20 | 14.2 | 3.2 | 47.7 | 25.9 | 4.4 | 8.7 |
| 21 | 15.2 | 3.7 | 51.7 | 25.9 | 3.8 | 8.1 |
| 22 | 15.1 | 3.4 | 50.6 | 26.7 | 4.3 | 8.7 |
| 23 | 16.5 | 3.7 | 54.9 | 20.7 | 3 | 8.8 |
| 24 | 6.4 | 2 | na | 23.5 | 6.4 | 6.3 |
| 25 | 19.1 | 0.9 | 59.4 | 10.7 | 6.5 | 41.8 |
| 26 | 15.7 | 3.7 | 53.9 | 13.5/14.1 | 2/2.5 | 8.4 |
| 27 | 14.7 | 3.6 | 51.1 | 28.2 | 4.2 | 8 |
| 28 | 14.1 | 4.3 | na | 33.5 | 4.2 | 6.5 |
| 29 | 14.1 | 4.2 | na | 29.8 | 3.9 | 6.6 |
| 30 | 19.1 | 2.1 | na | 17.6 | 4.6 | 17.9 |

TABLE 4

| | Polymerization conditions | | | | Polymer characterization | | | | |
|---|---|---|---|---|---|---|---|---|---|
| Ex. | Catal. Mg | Cocatalyst type | $C_4^-$ g | $H_2$ bar | Yield Kg/g*h | $C_4$ % wt | MIE g/10' | density g/cc | Tm °C. | X.S % wt |
| 13 | 14.4 | TMA | 150 | 1.5 | 2.6 | 6.4 | 0.5 | 0.9206 | 120.7 | 2.2 |
| 14 | 19.5 | TEA/DEAC 2-1 | 180 | 1.5 | 10 | 8.6 | 1.4 | 0.9211 | 121.7 | 8.5 |
| 15 | 10.4 | TMA | 150 | 1.5 | 13 | 6.1 | 0.43 | 0.9189 | 121.7 | 4.8 |

TABLE 4-continued

| | | Polymerization conditions | | | Polymer characterization | | | | | |
|---|---|---|---|---|---|---|---|---|---|---|
| Ex. | Catal. Mg | Cocatalyst type | $C_4^-$ g | $H_2$ bar | Yield Kg/g * h | $C_4$ % wt | MIE g/10' | density g/cc | Tm °C. | X.S % wt |
| 16 | 14.5 | TMA | 150 | 1.5 | 3.4 | 6.5 | 0.5 | 0.921 | 121.2 | 4.7 |
| 17 | 14.8 | TMA | 150 | 1.5 | 5.1 | 5.1 | 0.3 | 0.9165 | 122.3 | 2.8 |
| 18 | 31 | TIBA/DEAC 4-1 | 200 | 1.5 | 2.5 | 10.5 | 0.76 | 0.9161 | 118.1 | 11.7 |
| 19 | 15.5 | TEA/DEAC 2-1 | 180 | 1.5 | 2.3 | 8.5 | 0.7 | 0.921 | 120.6 | 6.7 |
| 20 | 15.6 | TEA/DEAC 2-1 | 180 | 1.5 | 12.5 | 8.1 | 1.6 | 0.9255 | 121.7 | 6.8 |
| 21 | 15.8 | TEA/DEAC 2-1 | 180 | 1.5 | 11.2 | 9 | 2.7 | 0.9201 | 121.1 | 11.9 |
| 22 | 21 | TEA/DEAC 2-1 | 180 | 1.5 | 11.3 | 8.3 | 1 | 0.9174 | 120 | 12.3 |
| 23 | 13.8 | TMA | 150 | 1.8 | 9.8 | 4.1 | 0.3 | 0.9238 | 121.6 | 2.3 |
| 24 | 24.8 | TMA | 200 | 1.5 | 2.42 | 9.4 | 1.1 | 0.9168 | 121.6 | 12.9 |
| 25 | 20.4 | TEA/DEAC 2-1 | 180 | 1.5 | 7.7 | 6.8 | 0.9 | 0.9239 | 122 | 3.7 |
| 26 | 17.4 | TEA/DEAC 2-1 | 150 | 1.5 | 4.6 | 9.7 | 2.2 | 0.9188 | 121.5 | 11.06 |
| 27 | 9.9 | TEA | 150 | 1.5 | 8.8 | 6 | 1.1 | 0.9260 | 123.5 | 4.8 |
| 28 | 15.1 | TMA | 150 | 1.8 | 6.3 | 8.4 | 3.3 | 0.918 | 120.8 | 11.7 |
| 29 | 15.4 | TMA | 200 | 1.8 | 15.8 | 7.2 | 0.96 | 0.921 | 122.2 | 5.7 |
| 30 | 15 | TMA | 150 | 1.8 | 4.2 | 6.9 | 2 | 0.921 | 122.1 | 8.8 |

THF as External donor (except example 33); Al/THF = 5

The invention claimed is:

1. A process for preparing a catalyst component supported on $MgCl_2$ by contacting a Mg compound selected from Lewis adducts of formula $MgX_2$ (R"OH)$_m$ in which the R" groups are C1-C20 hydrocarbon groups, X is chlorine and m is from 0.1 to 6; a Ti compound; and an electron donor compound (ED) selected from alcohol, alkyl esters of C1-C20 aliphatic carboxylic acids, ketones, amines, amides, nitriles, alkoxysilanes and aliphatic ethers as essential compounds, said process comprising reacting in at least two reaction steps at least one of said essential compounds as fresh reactant alone or in a mixture in which it constitutes a main component, wherein the Lewis adduct is first reacted with the Ti compound, thereby obtaining a solid intermediate, the solid intermediate is isolated, and in the last of said at least two reaction steps the solid intermediate is then contacted with the electron donor compound (ED) as fresh reactant.

2. The process according to claim 1 in which the electron donor compound (ED) is selected from the group consisting of ethers, alkyl esters of C1-C20 aliphatic carboxylic acids and alkoxysilanes.

3. The process according to claim 2 in which the electron donor compound (ED) is selected from the group consisting of cyclic ethers and alkyl esters of C1-C20 aliphatic carboxylic acids.

4. The process according to claim 1 in which the electron donor compound (ED) is selected from the group consisting of tetrahydrofurane, methylformiate and ethylacetate ethylformiate, methylacetate, propylacetate, i-propylacetate, n-butylacetate, i-butylacetate, methyltrimethoxysilane, dimethyldimethoxysilane and trimethylmethoxysilane.

5. The process according to claim 1 in which the titanium compound is a tetrahalide or compound of formula $TiX_n(OR^1)_{4-n}$, where $0 \leq n \leq 3$, X is halogen and $R^1$ is $C_1$-$C_{10}$ hydrocarbon group.

6. The process according to claim 5 in which the titanium compound is $TiCl_4$.

7. The process according to claim 1 in which m is from 0.5 to 2.

8. The process according to claim 1 in which the Lewis adduct is reacted with a titanium tetrahalide or a $TiX_n(OR^1)_{4-n}$ compound, wherein $0 \leq n \leq 3$, X is halogen and $R^1$ is a $C_1$-$C_{10}$ hydrocarbon group.

9. The process according to claim 8 in which the titanium compound is $TiCl_4$.

10. The process according to claim 9 in which the reaction of the $TiCl_4$ with the Lewis adduct is repeated twice.

11. The process according to claim 8 in which the solid intermediate undergoes a pre-polymerization step before being reacted with the electron donor compound (ED).

12. The process according to claim 11 in which the pre-polymerization step is carried out by pre-polymerizing ethylene or propylene or mixtures thereof, forming amounts of a polymer from about 0.1 g up to about 1000 g per gram of solid intermediate.

13. The process according to claim 8 in which the solid intermediate is contacted with the electron donor compound (ED) in amounts suitable to have a ED molar ratio with respect to the Ti content in the intermediate product ranging from 0.5 to 20.

14. The process according to claim 10 in which the solid intermediate is contacted with the electron donor compound (ED) in a liquid medium.

15. A solid catalyst component for the polymerization of olefins comprising a Ti compound comprising Ti atoms and an electron donor compound (ED) selected from alcohol, ketones, amines, amides, nitriles, alkoxysilanes, aliphatic ethers, and alkyl esters of C1-C20 aliphatic carboxylic acids supported on Mg dichioride in which an ED/Ti molar ratio ranges from 1.5 to 3.5 and a Mg/Ti molar ratio is higher than 5.5.

16. The solid catalyst component according to claim 15 in which the ED/Ti molar ratio ranges from 2 to 3.4 and the Mg/Ti ratio ranges from 7 to 110.

17. The solid catalyst component according to claim 15 in which the electron donor compound (ED) is selected from cyclic aliphatic ethers and carboxylic acid esters.

18. The solid catalyst component according to claim 17 in which the electron donor compound (ED) is ethylacetate or tetrahydrofurane.

19. The solid catalyst component according to claim 15 in which the titanium atoms derive from titanium tetrahalides or the compounds of formula $TiX_n(OR^1)_{4-n}$, where $0 \leq n \leq 3$, X is halogen and R is $C_1$-$C_{10}$ hydrocarbon group.

20. The process of claim 5 wherein X is chlorine.

* * * * *